United States Patent
Chuang et al.

(10) Patent No.: US 10,363,914 B2
(45) Date of Patent: Jul. 30, 2019

(54) SELF-SEALING HYDRAULIC DEVICE

(71) Applicant: Lee Chi Enterprises Co., Ltd., Changhua, Changhua County (TW)

(72) Inventors: Hsiang-Yu Chuang, Changhua (TW); Wen-Tsung Liu, Chang Hwa (TW)

(73) Assignee: Lee Chi Enterprises Co., Ltd., Changhua (TW)

( * ) Notice: Subject to any disclaimer, the term of this patent is extended or adjusted under 35 U.S.C. 154(b) by 0 days.

(21) Appl. No.: 15/841,728

(22) Filed: Dec. 14, 2017

(65) Prior Publication Data

US 2018/0229703 A1     Aug. 16, 2018

(30) Foreign Application Priority Data

Feb. 14, 2017   (TW) .............................. 106202095 U

(51) Int. Cl.
*B60T 17/04*     (2006.01)
*B60T 11/236*    (2006.01)
(Continued)

(52) U.S. Cl.
CPC ............. *B60T 11/323* (2013.01); *B60T 7/102* (2013.01); *B60T 11/16* (2013.01); *B60T 11/236* (2013.01);
(Continued)

(58) Field of Classification Search
CPC . F16L 37/35; F16L 37/32; F16L 29/02; B60T 11/323; B60T 11/236; B60T 17/043; B62L 3/023
See application file for complete search history.

(56) References Cited

U.S. PATENT DOCUMENTS 2,509,444 A * 5/1950 Mitchell ............... F16L 37/252
                                                137/614.04
RE23,365 E  * 5/1951 Stranberg .............. F16L 37/086
                                                137/614.04
(Continued)

FOREIGN PATENT DOCUMENTS

CN    105775022 A     7/2016
FR       2906341 A3 * 3/2008  ............ F16L 37/088
TW    M542607 U      6/2017

OTHER PUBLICATIONS

EPO translation, FR 2906341 A3, Mar. 2008. (Year: 2008).*

*Primary Examiner* — Thomas J Williams
(74) *Attorney, Agent, or Firm* — C. G. Mersereau

(57) ABSTRACT

A self-sealing hydraulic device has a connecting assembly and a hydraulic assembly. The connecting assembly has an adaptor having a shell, a male fitting, and a barb fitting. The male fitting is mounted in the shell, is axially moveable relative to the shell, and has an axial hole and a radial hole orthogonally communicating with the axial hole. The radial hole is sealed by the shell. The barb fitting is connected to and communicates with both the shell and a hose. The hydraulic assembly is assembleable to the connecting assembly and has a housing, an elastic element, and a valve unit. The housing has a hydraulic chamber and an assembling hole communicating with the hydraulic chamber via a through hole. The elastic element is disposed in the housing. The valve unit is disposed inside the hydraulic chamber and driven by the elastic element to seal the through hole.

10 Claims, 11 Drawing Sheets

(51) Int. Cl.

| | | |
|---|---|---|
| *B62L 3/02* | (2006.01) | |
| *F16L 29/02* | (2006.01) | |
| *F16L 37/32* | (2006.01) | |
| *F16L 37/35* | (2006.01) | |
| *B60T 11/32* | (2006.01) | |
| *B60T 7/10* | (2006.01) | |
| *B60T 11/16* | (2006.01) | |
| *B62L 1/02* | (2006.01) | |

(52) U.S. Cl.
CPC ............ *B60T 17/043* (2013.01); *B62L 3/023* (2013.01); *F16L 29/02* (2013.01); *F16L 37/35* (2013.01); *B62L 1/02* (2013.01)

(56) References Cited

U.S. PATENT DOCUMENTS

| | | | | |
|---|---|---|---|---|
| 2006/0151032 | A1* | 7/2006 | Giagnoli | F16L 37/35 |
| | | | | 137/614.04 |
| 2012/0067038 | A1* | 3/2012 | Becocci | F16L 37/23 |
| | | | | 60/458 |
| 2015/0247594 | A1* | 9/2015 | Vijayadevaraj | F16L 13/147 |
| | | | | 251/149.6 |
| 2016/0084413 | A1* | 3/2016 | Wen | F16L 21/08 |
| | | | | 285/33 |
| 2016/0200392 | A1 | 7/2016 | Bradley et al. | |

\* cited by examiner

SELF-SEALING HYDRAULIC DEVICE

BACKGROUND OF THE INVENTION

1. Field of the Invention

The present invention relates to a hydraulic device, and more particularly to a self-sealing hydraulic device that is able to prevent leakage in use.

2. Description of Related Art

A conventional hydraulic bicycle system has been disclosed in China Patent Publication No. 105775022 and US Patent Publication No. 2016/0200392. The conventional hydraulic bicycle system has a brake hand lever assembly, a hose assembly, and a brake caliper assembly. The brake hand lever assembly and the brake caliper assembly communicate with each other via the hose assembly. In a nutshell, the abovementioned conventional hydraulic bicycle system only provides a port valve mounted inside the brake hand lever assembly to prevent hydraulic oil from leaking from the brake hand lever assembly. However, the hose assembly is not equipped with any leak-proof structure. Therefore, once the hose assembly is detached from the brake hand lever assembly, a cap or a caliper may be used to seal the hose assembly to prevent leakage of the hydraulic oil inside the hose assembly. Otherwise, the hydraulic oil inside the hose assembly may leak from the hose assembly and contaminate a user's clothes or the environment.

To overcome the shortcomings of the conventional hydraulic bicycle system, the present invention provides a self-sealing hydraulic device to mitigate or obviate the aforementioned problems.

SUMMARY OF THE INVENTION

The main objective of the present invention is to provide a self-sealing hydraulic device that is able to simultaneously seal both a connecting assembly and a hydraulic assembly of the self-sealing hydraulic device.

The self-sealing hydraulic device comprises a connecting assembly and a hydraulic assembly. The connecting assembly has an adaptor having a shell, a male fitting, and a barb fitting. The male fitting is mounted in the shell, is axially moveable relative to the shell, and has an axial hole and a radial hole orthogonally communicating with the axial hole. The radial hole is sealed by the shell. The barb fitting is connected to and communicates with both the shell and a hose. The hydraulic assembly is assembleable to the connecting assembly and has a housing, an elastic element, and a valve unit. The housing has a hydraulic chamber and an assembling hole communicating with the hydraulic chamber via a through hole. The elastic element is disposed in the housing. The valve unit is disposed inside the hydraulic chamber and driven by the elastic element to seal the through hole.

Other objects, advantages, and novel features of the invention will become more apparent from the following detailed description when taken in conjunction with the accompanying drawings.

DETAILED DESCRIPTION OF PREFERRED EMBODIMENTS

Figure 1:
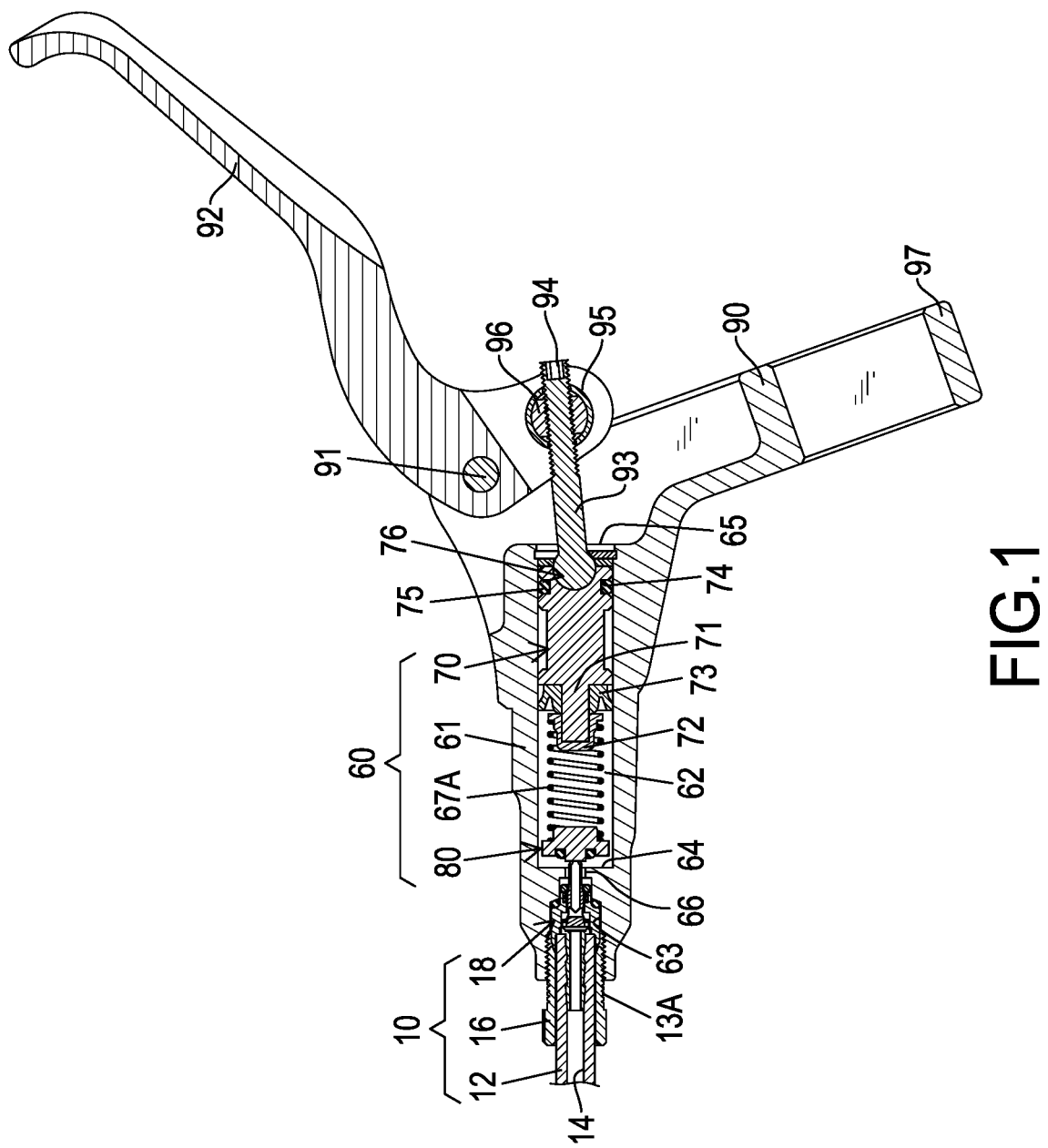
FIG. 1 is a cross sectional side view of a first embodiment of a self-sealing hydraulic device in accordance with the present invention, showing a hydraulic assembly integrally formed on a brake lever assembly.

With reference to FIG. 1, a first embodiment of a self-sealing hydraulic device in accordance with the present invention has a connecting assembly 10 and a hydraulic assembly 60. The connecting assembly 10 and the hydraulic assembly 60 are detachable from each other and are able to be applied to bicycles such as mountain bikes, road bikes, and so on.

The connecting assembly 10 has a hose 12, a connecting unit 16, and an adaptor 18. The hose 12 is flexible and has a channel 14 therein. The channel 14 of the hose 12 is connected to the adaptor 18. The connecting unit 16 is mounted on and around the hose 12 and is utilized to make the connecting assembly 10 detachably connect to the hydraulic assembly 60. The connecting unit 16 has a central hole 11, an abutting chamfer 15, and an outer thread 13A. The abutting chamfer 15 is formed at an end of the central hole 11. The external thread 13A is formed in a circumference of the connecting unit 16.

With reference to FIGS. 2 to 6, the adaptor 18 has a shell 20, a male fitting 30, an abutted flange 40, a compression spring 41, and a barb fitting 50. The shell 20 is hollow and has an axis 201, a first end face 20A, a second end face 20B, an abutted chamfer 21, a protrusion 22, a fillet portion 23, a first recess 24, an activity chamber 26, a bore 27, and a second recess 28. The first end face 20A and the second end face 20B are opposite each other. The abutted chamfer 21 is formed in the first end face 20A and has a diameter. The diameter of the abutted chamfer 21 gradually shrinks toward the first end face 20A according to the abutting chamfer 15 of the connecting unit 16. The protrusion 22 is disposed adjacent to the second end face 20B. The fillet portion 23 is connected to the protrusion 22 and contacted by an O-ring 17 that is mounted on and around the protrusion 22. The O-ring 17 is made of plastic or polymer and is blocked by the fillet portion 23.

The first recess 24, the activity chamber 26, the bore 27, and the second recess 28 have different diameters and are aligned with one another in sequence. The first recess 24 is defined in the first end face 20A of the shell 20 and has a bottom. The activity chamber 26 is formed inside the shell 20 and has an internal surface, an inner thread 25A, and a bottom 29. The inner thread 25A is formed in the internal surface of the activity chamber 26. The bore 27 is formed inside the shell 20. The second recess 28 is defined in the second end face 20B of the shell 20 and has a bottom. The bore 27 is disposed between the activity chamber 26 and the second recess 28, and the activity chamber 26 and the second recess 28 communicate with each other via the bore 27. The diameter of the bore 27 is smaller than both the diameters of the activity chamber 26 and the second recess 28. Therefore, the bottom 29 of the activity chamber 26 and the bottom of the second recess 28 are respectively disposed beside the bore 27.

The male fitting 30 is mounted in the shell 20 and is moveable relative to the shell 20 along the axis 201 of the shell 20. The male fitting 30 has an abutting portion 31, a first end 32, a second end 33, a blocking portion, multiple gaps 35, a receiving groove 36, an axial hole 37, two radial holes 38A, 38B, and an indention 39. The first end 32 and the second end 33 of the male fitting 30 are opposite each other. The abutting portion 31 extends till the second end 33 of the male fitting 30. The blocking portion is disposed at the first end 33 of the male fitting 30 and has multiple blocks 34 annularly arranged. Each one of the multiple gaps 35 is formed between each two adjacent blocks 34 of the multiple blocks 34. The receiving groove 36 is annularly formed in the multiple blocks 34, faces the second end 33 of the male fitting 30, and receives a seal 42.

The axial hole 37 is formed in the abutting portion 31 and extends along the axis 201 of the shell 20. The two radial holes 38A, 38B are radially defined in the abutting portion 31 and orthogonally communicate with the axial hole 37. The indention 39 is formed in the abutting portion 31, is disposed at the second end 33 of the male fitting 30, and communicates with the two radial holes 38A, 38B via the axial hole 37. When the male fitting 30 is mounted to the shell 20, the blocking portion of the male fitting 30 abuts against the bottom 29 of the activity chamber 26 to block the bore 27 and the activity chamber 26.

The abutted flange 40 is connected to the abutting portion 31 and disposed out of the shell 20. The abutted flange 40 has an inner thread 25B and is screwed with an outer thread 13B formed on an external surface of the abutting portion 31. The abutted flange 40 may be a nut. The compression spring 41 is mounted around the abutting portion 31 and has two opposite ends respectively abutting against the abutting flange 40 and a bottom of the second recess 28. When the connecting assembly 10 is detached from the hydraulic assembly 60, the compression spring 41 pushes the abutted flange 40 to make the male fitting 30 and the seal 42 move toward the second end face 20B of the shell 20. The two radial holes 38A, 38B are disposed in the bore 27. The blocking portion of the male fitting 30 and the seal 42 abut against the bottom 29 of the activity chamber 26. Then, the bore 27 and the activity chamber 26 are blocked by the blocking portion of the male fitting 30 and the seal 42 without communicating with each other. The seal 42 may be made of plastic or polymer as well. The seal 42 is able to move with the blocking portion of the male fitting 30 along the axis 201 of the shell 20. The seal 42 may abut against the bottom 29 of the activity chamber 26 to seal the bore 27 and the activity chamber 26. Or the seal 42 may move toward the first recess 24 and make the bore 27 communicate with the activity chamber 26.

The barb fitting 50 has a connecting portion 51, a barb section 52, a first end 54, a second end 53, a straight hole 56, and a conical hole 57. The first end 54 and the second end 53 of the barb fitting 50 are opposite each other. The connecting portion 51 is disposed at the second end 53 of the barb fitting 50. The barb section 52 is integrally formed on the connecting portion 51. The straight hole 56 is disposed in the barb section 52. The conical hole 57 is disposed in the connecting portion 51 and communicates with the straight hole 56. With reference to FIG. 1, the barb section 52 is inserted into the channel 14 of the hose 12. The shell 20 and the hose 12 are connected together by the barb fitting 50, and the channel 14 communicates with the first recess 24 of the shell 20.

With reference to FIGS. 1, 4, 5, and 7, the hydraulic assembly 60 has a housing 61, an elastic element 67A, a piston assembly 70, and a valve unit 80. The housing 61 has a hydraulic chamber 62, an assembling hole 63, and a through hole 66. The hydraulic chamber 62, the assembling hole 63, and the through hole 66 are formed inside the hydraulic assembly 60. The hydraulic chamber 62 has a first end 64 and a second end 65 opposite the first end 64 of the hydraulic chamber 62. The assembling hole 63 has an internal thread 25C. The assembling hole 63 is a stepped hole with multiple diameters. The diameters of the assembling hole 63 gradually shrink toward the hydraulic chamber 62. The connecting unit 16 mounted on and around the hose 12 is connected to the housing 61 of the hydraulic assembly 60. The external thread 13A is screwed with the internal thread 25C of the assembling hole 63.

The through hole 66 is disposed between the hydraulic chamber 62 and the assembling hole 63. The through hole 66 extends to the first end 64 of the hydraulic chamber 62. The hydraulic chamber 62 and the assembling hole 63 communicate with each other via the through hole 66. The through hole 66 has a diameter smaller than each one of the diameters of the assembling hole 63. The elastic element 67A is disposed in the hydraulic chamber 62 of the housing 61 and has two opposite ends. The elastic element 67A may be made of metal or non-metal and may be implemented as a compression spring or multiple Belleville washers.

The piston assembly 70 is inserted into the hydraulic chamber 62 and has a piston rod 71, a front cap 72, an oil seal 73, a circular groove 74, and a seal 75. The piston rod 71 reciprocates between an active position and an inactive position. The piston rod 71 has two opposite ends. One of the two opposite ends of the piston rod 71 faces to the first end 64 of the hydraulic chamber 62. The other of the two opposite ends of the piston rod 71 faces to the second end 65 of the hydraulic chamber 62. The front cap 72 is mounted to one of the two opposite ends of the piston rod 71 that faces to the first end 64 of the hydraulic chamber 62. The oil seal 73 is mounted on and around the piston rod 71 and disposed between the front cap 72 and the piston rod 71. The oil seal 73 is restricted by the front cap 72 and fixed on the piston rod 71. The circular groove 74 is formed in a circumference of the piston rod 71 and disposed adjacent to one of the two opposite ends of the piston rod 71 that faces to the second end 65 of the hydraulic chamber 62. The seal 75 is received in the circular groove 74.

The valve unit 80 is disposed in the hydraulic chamber 62 and has a checking portion 81, a pillar portion 84, a rod portion 85, a holding groove 86, and a sealing O-ring 87. The checking portion 81 has a sealing end 82, a back end 83, a polygonal cross section, multiple corners 88, multiple diagonals, and multiple lateral faces. The sealing end 82 and the back end 83 are opposite each other. The sealing end 82 of the checking portion 81 faces to the first end 64 of the hydraulic chamber 62. The back end 83 of the checking portion 82 faces to the second end 65 of the hydraulic chamber 62.

Each one of the multiple diagonals of the checking portion 81 has a length smaller than a diameter of the hydraulic chamber 62 of the housing 61. The multiple corners 88 of the checking portion 81 contact an internal surface of the hydraulic chamber 62 of the housing 61 to restrict the checking portion 81 to move along the hydraulic chamber 62. Each one of the multiple lateral faces of the checking portion 81 is spaced from the internal surface of the hydraulic chamber 62 by a passage 89 for hydraulic oil to pass. In the first embodiment of the present invention, the cross section of the checking portion 81 is hexagonal. The cross section of the checking portion 81 may be implemented as a triangle, a square, or a pentagon.

The pillar portion 84 is formed at the back end 83 of the checking portion 81 and extends toward the second end 65 of the hydraulic chamber 62 and the front cap 72 of the piston assembly 70. The elastic element 67A of the hydraulic assembly 60 is a compression spring. One of the two opposite ends of the elastic element 67A is mounted on and around the pillar portion 84 and abuts against the checking portion 81. The other one of the two opposite ends of the elastic element 67A abuts against the front cap 72 of the piston assembly 70. The rod portion 85 is formed at the sealing end 82 of the checking portion 81 and extends toward the through hole 66 and the first end 64 of the hydraulic chamber 62.

Figure 5:
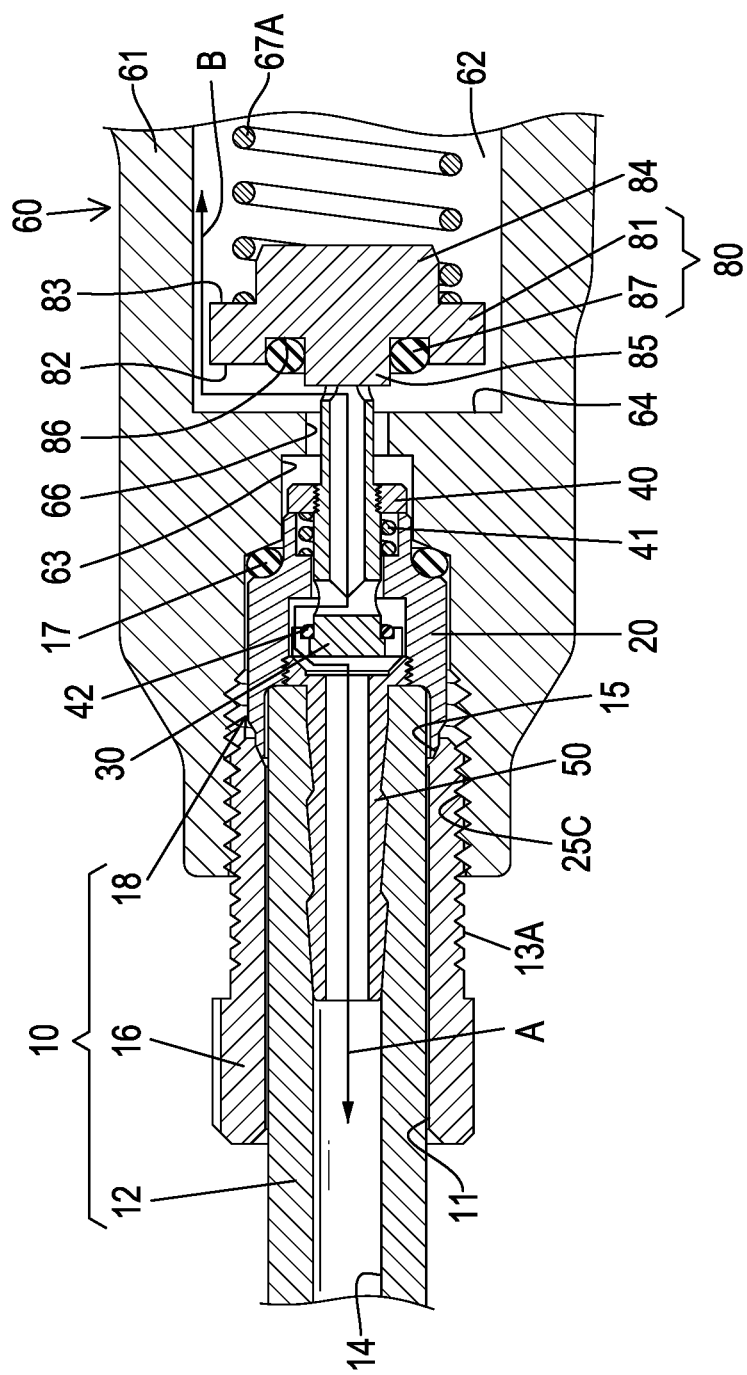
FIG. 5 is a cross sectional side view of the self-sealing hydraulic device in FIG. 1, showing a connecting assembly assembled to a hydraulic assembly.

With reference to FIG. 5, when the connecting assembly 10 is assembled to the hydraulic assembly 60, the adaptor 18 is inserted inside the assembling hole 63. The male fitting 30 of the adaptor 18 and the rod portion 85 of the valve unit 80 abut against each other. The male fitting 30 pushed by the valve unit 80 moves toward the barb fitting 50 till the blocking portion of the male fitting 30 abuts the connecting portion 51 of the barb fitting 50. The blocking portion of the male fitting 30 and the seal 42 are detached from the bottom 29 of the activity chamber 26 to make the activity chamber 26 communicate with the bore 27. The two radial holes 38A, 38B are disposed in the activity chamber 26. The compression spring 41 is compressed by the shell 20 and the abutting flange 40. With reference to FIG. 5, the rod portion 85 of the valve unit 80 is pushed by the second end 33 of the male fitting 30 and moves out from the through hole 66. The sealing O-ring 87 and the checking portion 81 are detached from the first end 64 of the hydraulic chamber 62 to make the through hole 66 and the hydraulic chamber 62 communicate with each other.

Figure 7:
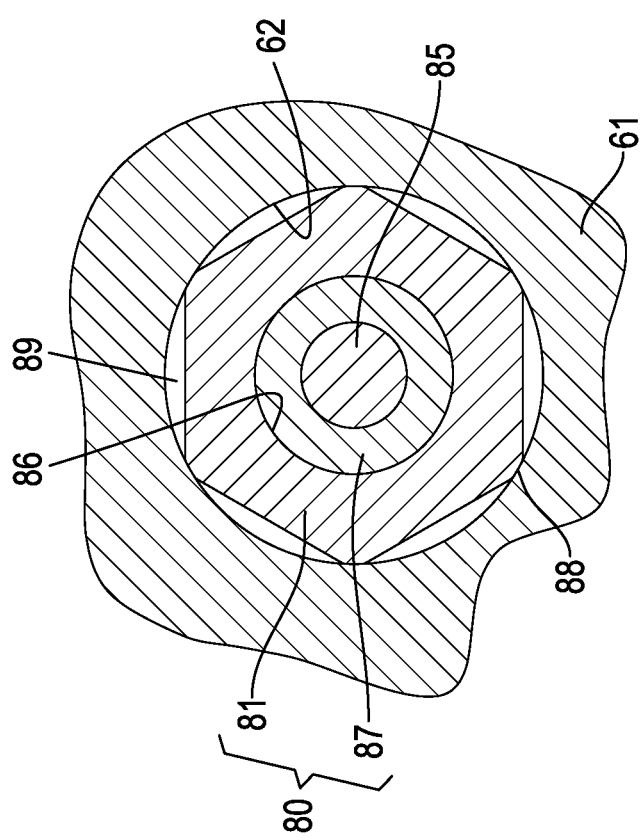
FIG. 7 is a cross sectional side view of the hydraulic assembly in FIG. 1.

With reference to FIGS. 5 and 7, the hydraulic oil may follow in a direction of an arrow symbol A in FIG. 5. The hydraulic oil inside the hydraulic chamber 62 flows through the multiple passages 89, the indention 39 and the axial hole 37 of the male fitting 30, the two radial holes 38A, 38B, and the multiple gaps 35 of the male fitting 30 to enter the activity chamber 26. Then, the hydraulic oil flows continually through the conical hole 57 and the straight hole 56 of the barb fitting 50 to enter the channel 14 of the hose 12.

With reference to FIGS. 5 and 7, the hydraulic oil may reversely follow a direction of an arrow symbol B in FIG. 5. The hydraulic oil flows from the hose 12 to the hydraulic chamber 62 of the housing 61.

Figure 2:
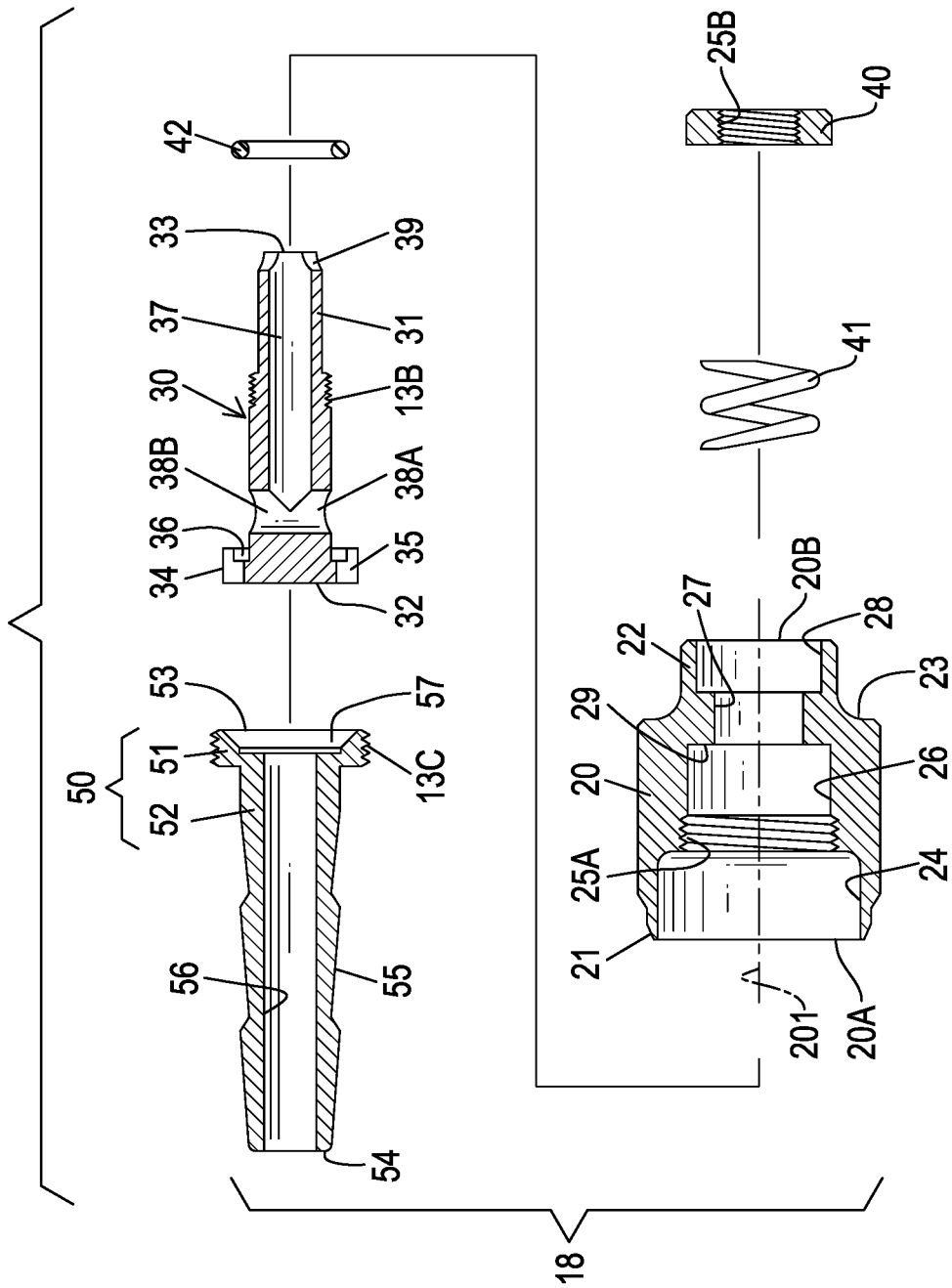
FIG. 2 is an exploded side view in partial section of an adaptor of the self-sealing hydraulic device in FIG. 1.
Figure 3:
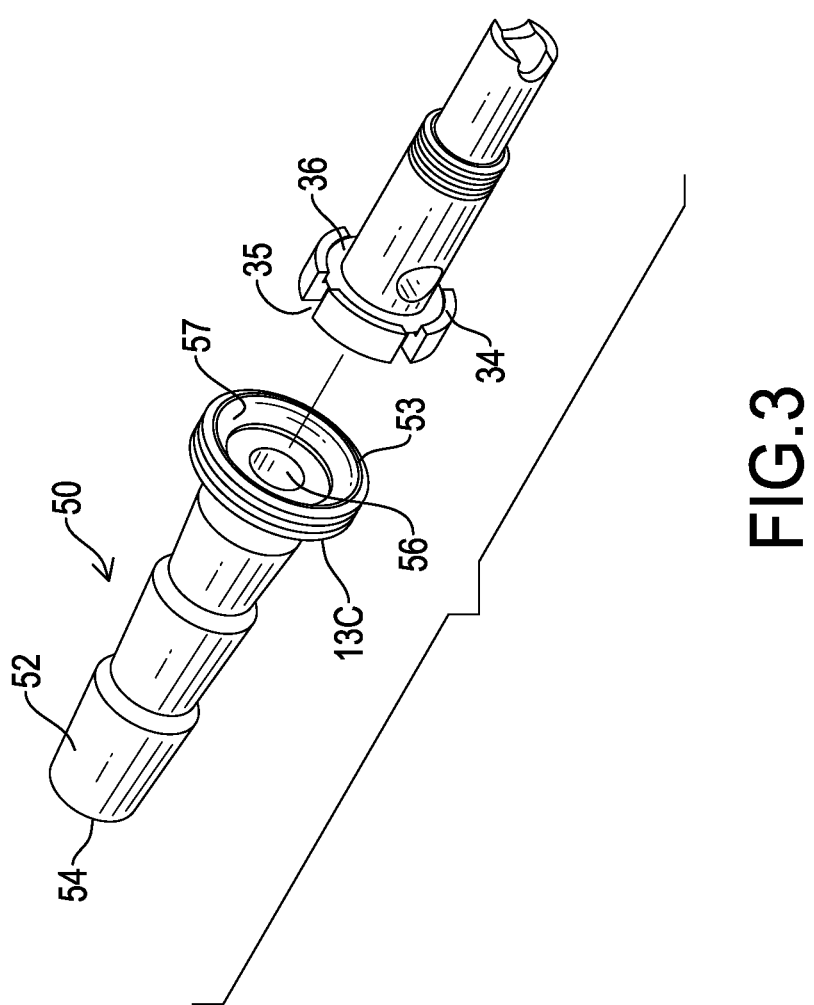
FIG. 3 is a partially exploded perspective view of the adaptor of the self-sealing hydraulic device in FIG. 1.
Figure 4:
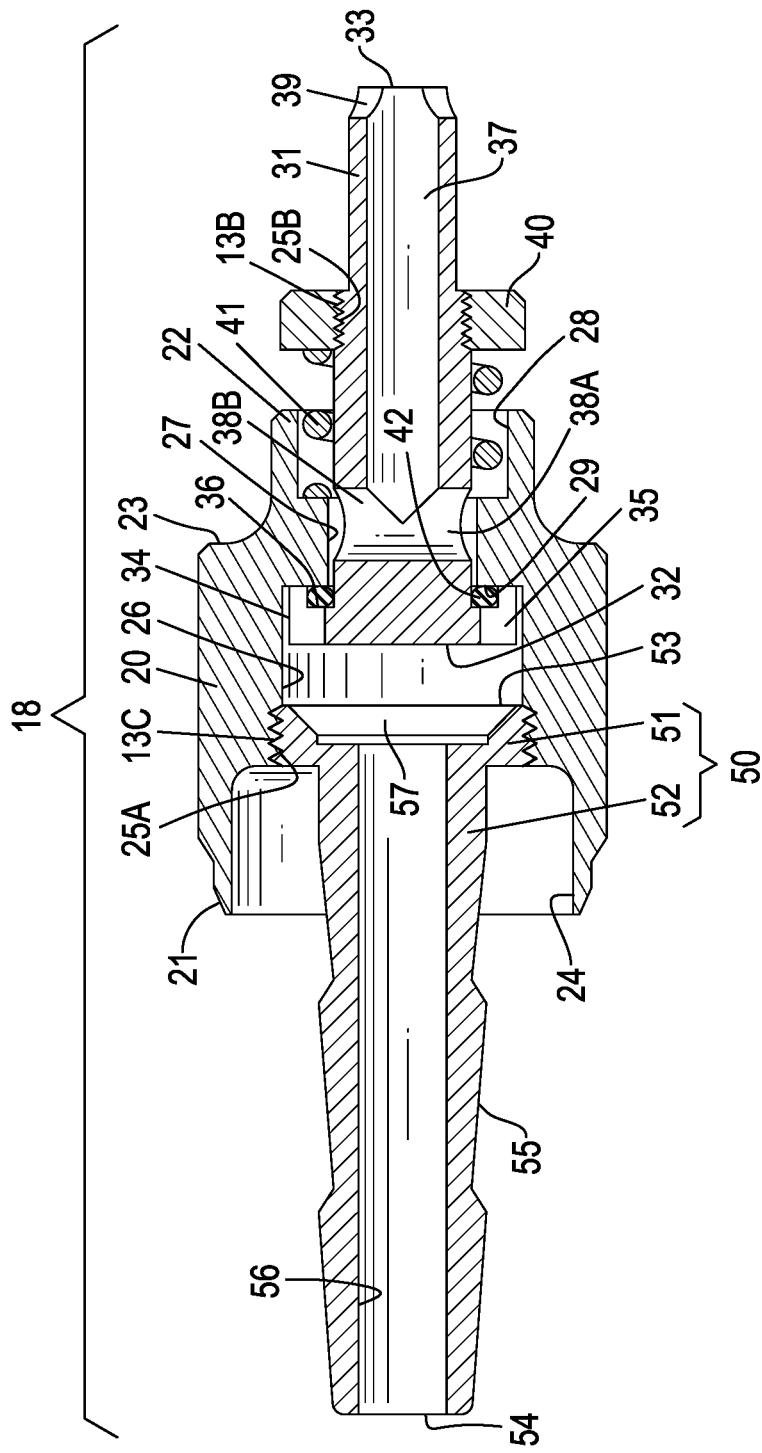
FIG. 4 is a cross sectional side view of the adaptor in FIG. 1.

With reference to FIGS. 2, 4, and 5, the connecting unit 16 is connected to the housing 61, and the abutting chamfer 15 of the connecting unit 16 abuts against the abutted chamfer 21 of the shell 20 that is disposed in the assembling hole 63. The shell 20 is pushed by the connecting unit 16 and moves toward the through hole 66. The fillet portion 23 of the shell 20 abuts the O-ring 17 and makes the O-ring 17 abut against the bottom of the assembling hole 63 to prevent leakage from the housing 61.

Figure 6:
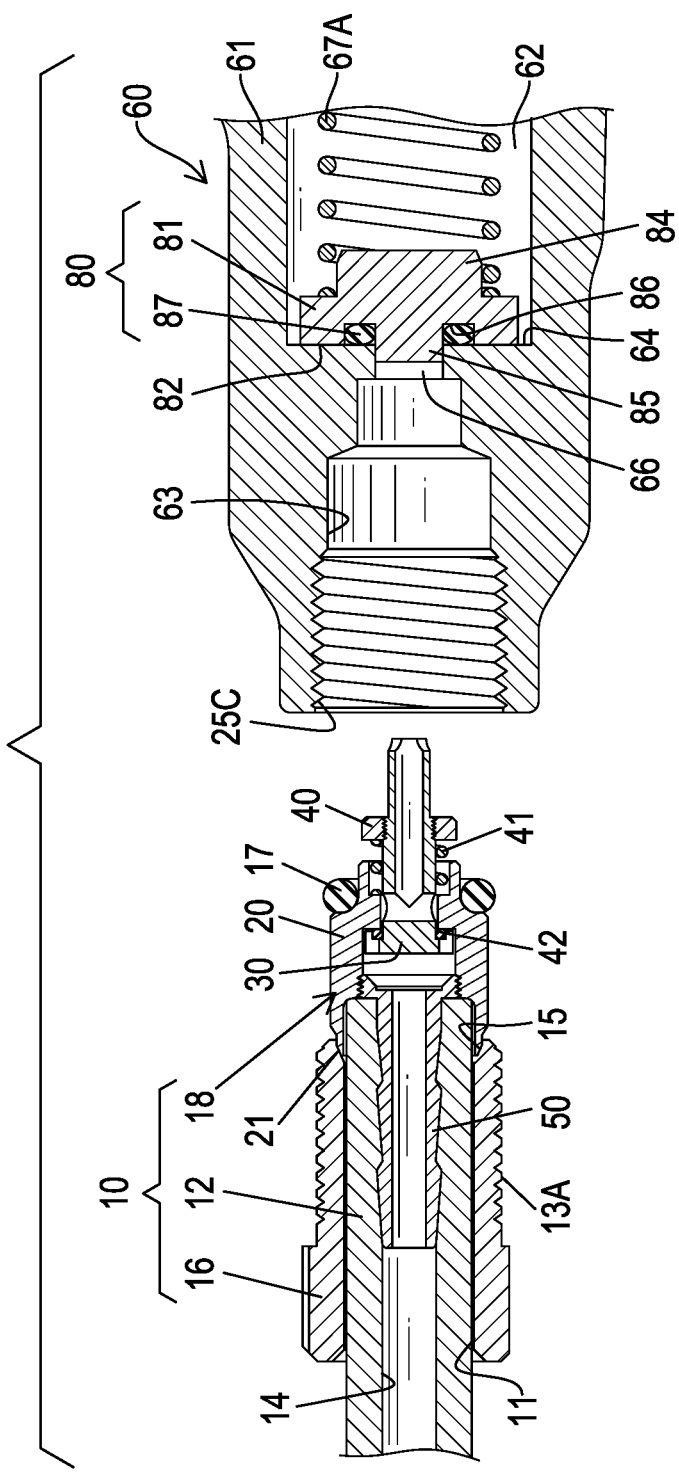
FIG. 6 is a cross sectional side view of the self-sealing hydraulic device in FIG. 1, showing the connecting assembly detached from the hydraulic assembly.

With reference to FIGS. 2 and 6, when the connecting assembly 10 is detached from the hydraulic assembly 60, the adaptor 18 of the connecting assembly 10 moves out from the assembling chamber 63. The connecting unit 16 is detached from the assembling hole 63 of the housing 61. The male fitting 30 and the valve unit 80 do not abut against each other. The compression spring 41 restores and pushes the abutting flange 40 connected to the male fitting 30. The male fitting 30 moves toward the second end face 20B of the shell 20. The blocking portion of the male fitting 30 and the seal 42 abut against the bottom 29 of the activity chamber 26 again and block the bore 27 and the activity chamber 26. The two radial holes 38A, 38B are disposed in the bore 27 again. The hydraulic oil inside the channel 14 of the hose 12 cannot leak from the activity chamber 26.

On the other hand, the elastic element 67A restores and pushes the checking portion 81. The checking portion 81 and the O-ring 87 of the valve unit 80 move toward the first end 64 of the hydraulic chamber 62 and abut against the first end 64 of the hydraulic chamber 62 again. The rod portion 85 of the valve unit 80 moves into the through hole 66. The checking portion 81 and the O-ring 87 block the through hole 66 and the hydraulic chamber 62. The hydraulic oil insides the hydraulic chamber 62 cannot leak from the hydraulic chamber 62.

The self-sealing hydraulic device in accordance with the present invention prevents the hydraulic oil from leaking from the connecting assembly 10 and the hydraulic assembly 60.

With reference to FIG. 1, the hydraulic assembly 60 is assembled to a brake lever assembly 90 of a bicycle. The brake lever assembly 90 has a mount, a pivoting shaft 91, a brake lever 92, a sleeve 95, a connecting block 96, a connecting component, and a fastening component 97. The brake lever 92 is pivotally connected to the mount by the pivoting shaft 91. The sleeve 95 is mounted on and around the connecting block 96. The connecting block 96 and the sleeve 95 are assembled to the brake lever 92. The connecting block 96 is swingable by the pivoting of the pivoting shaft 91.

The connecting component of the brake lever assembly 90 has two opposite ends, a ball joint 76, and an adjusting section 93. The ball joint 76 and the adjusting section 93 are respectively disposed at the two opposite ends of the connecting component of the brake lever assembly 90. The ball joint 76 is mounted to the piston rod 71 of the piston assembly 70. The adjusting section 93 is screwed with the connecting block 96 and has a hexagonal socket 94 for inserting an Allen key. The connecting component of the brake lever assembly 90 may be driven by the Allen key to adjust a distance between the ball joint 76 and the connecting block 96. The fastening component 97 may be a caliper and is designed to fix the brake lever assembly 90 to a frame of the bicycle.

Figure 8:
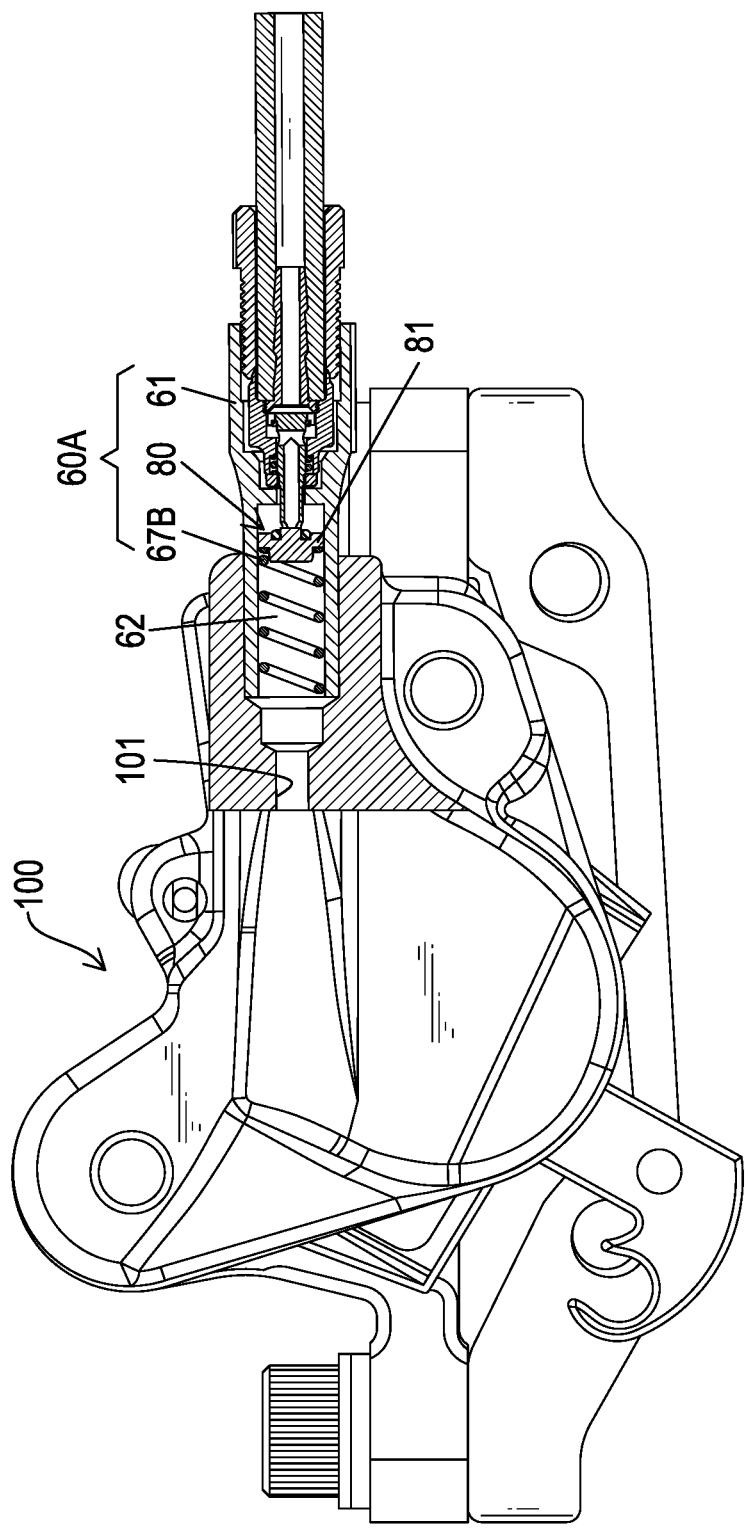
FIG. 8 is a side view in partial section of the self-sealing hydraulic device in accordance with the present invention, showing the self-sealing hydraulic device connected to a hydraulic brake.
Figure 9:
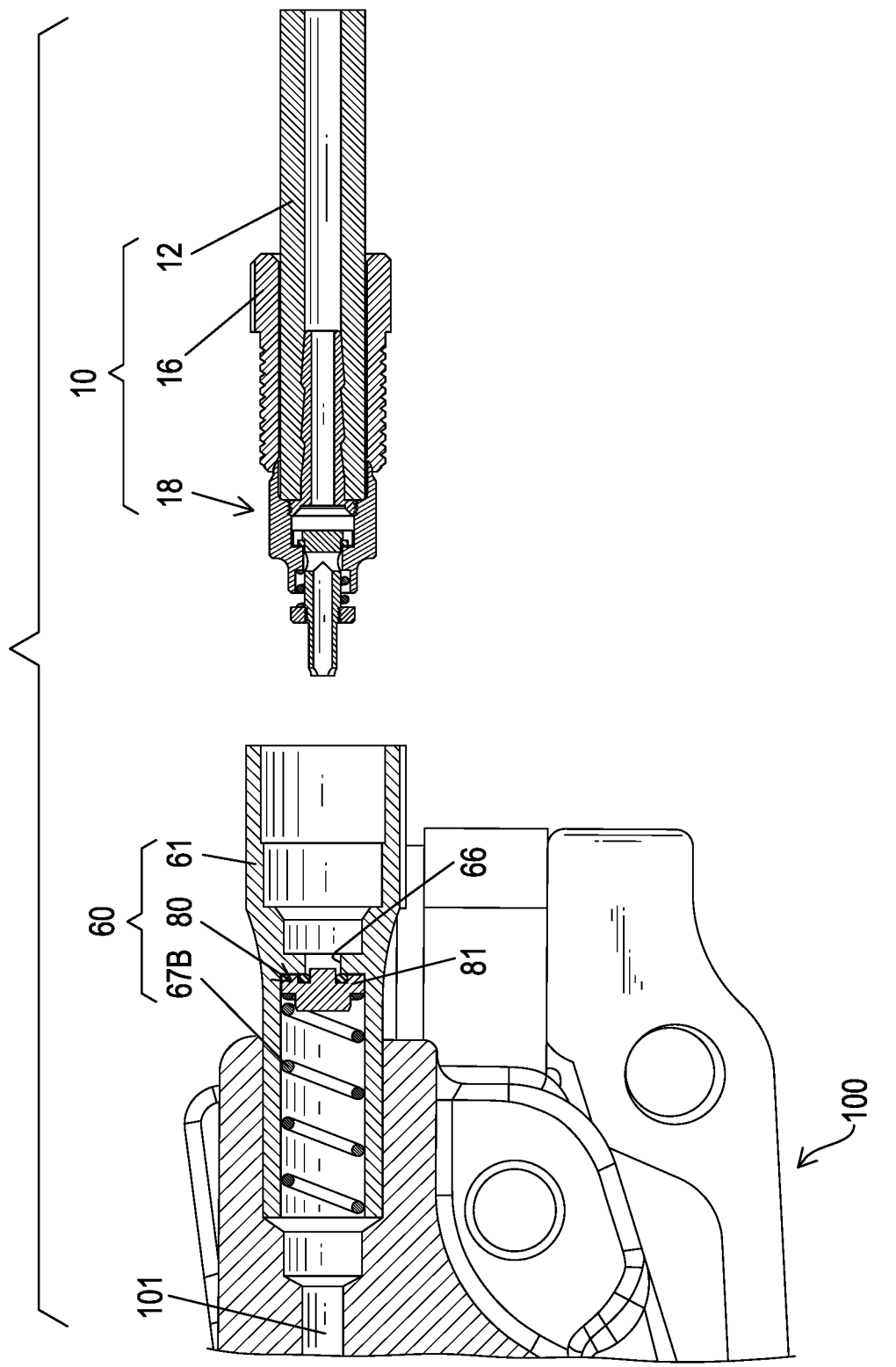
FIG. 9 is a side view in partial section of the self-sealing hydraulic device in FIG. 8, showing a connecting assembly detached from a hydraulic assembly.

With reference to FIGS. 8 and 9, the housing 61 of the hydraulic assembly 60 is connected to a connecting port 101 of a hydraulic brake 100. The hydraulic chamber 62 communicates with the inside of the connecting port 101. The elastic element 67B is inserted in the hydraulic chamber 62 and is disposed between the hydraulic chamber 62 and the connecting port 101.

Figure 10:
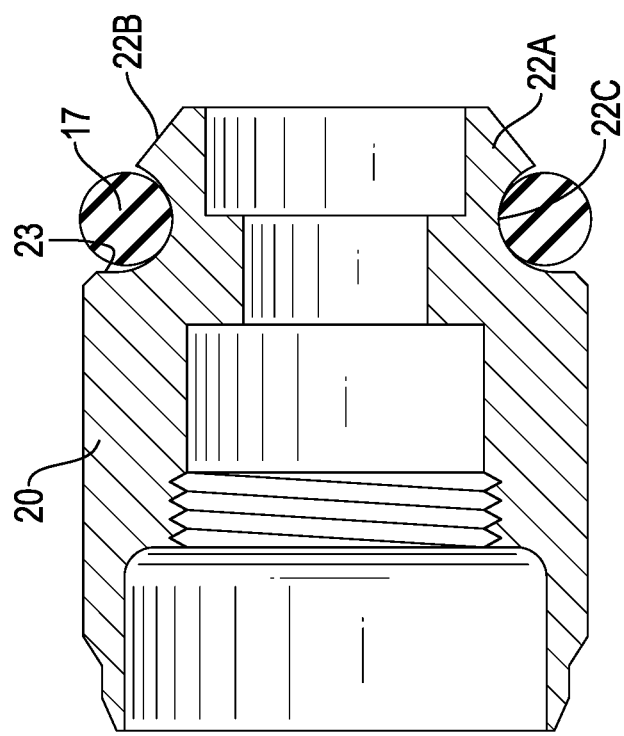
FIG. 10 is a cross sectional side view of a second embodiment of a shell of the self-sealing hydraulic device in accordance with the present invention.
Figure 11:
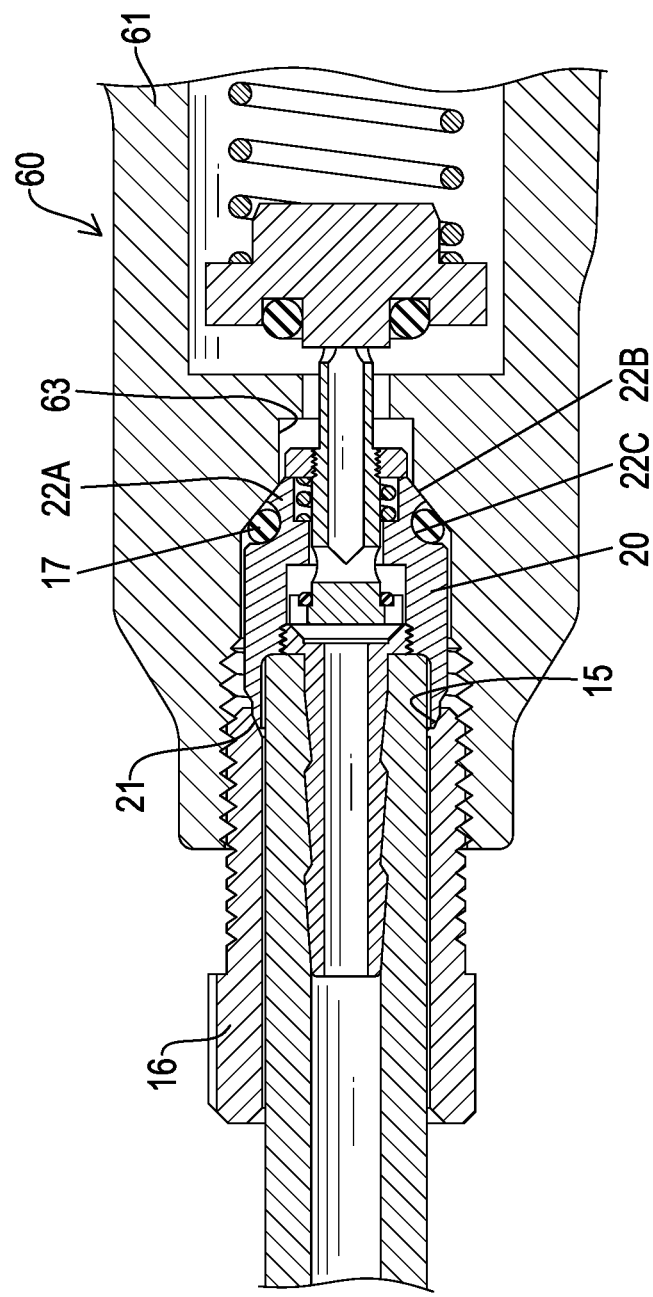
FIG. 11 is a cross sectional side view of the self-sealing hydraulic device in accordance with the present invention, showing the shell in FIG. 10 inserted in the hydraulic assembly.

With reference to FIGS. 10 and 11, a second embodiment of the self-sealing hydraulic device in accordance with the present invention is substantially the same as the first embodiment. In the second embodiment, the protrusion 22A of the shell 20 has a chamfer portion 22B and a restricting groove 22C. The restricting groove 22C is disposed between the chamfer portion 22B and the fillet portion 23 of the shell 20. The restricting groove 22C is designed to restrict the O-ring 17.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A self-sealing hydraulic device comprising:
   a connecting assembly having
      a hose with a channel therein; and
      an adaptor having
         a shell having
            an axis;
            a first end face;
            a second end face;
            a protrusion disposed adjacent to the second end face of the shell;
            a fillet portion connected to the protrusion and contacted by an O-ring mounted on and around the protrusion;
            an activity chamber formed inside the shell and having a bottom;
            a first recess defined in the first end face;
            a second recess defined in the second end face of the shell;
            a bore defined in the bottom of the activity chamber, the activity chamber and the second recess communicating with each other via the bore;
         a male fitting mounted in the shell, being moveable relative to the shell along the axis of the shell, and having
            a first end;
            a second end opposite the first end of the male fitting;
            an abutting portion extending till the second end of the male fitting, passing through the bore, and extending out of the second recess;
            a blocking portion disposed at the first end of the male fitting, received in the activity chamber, and capable of being blocked by the bottom of the activity chamber;
            an axial hole radially defined through the abutting portion and disposed between the first end of the male fitting and the second end of the male fitting, and extending along the axis of the shell;
            a radial hole orthogonally communicating with the axial hole and sealed by the shell; and
            an indention formed in the abutting portion, disposed at the second end of the male fitting, and communicating with the radial hole via the axial hole;
      a barb fitting connected to and communicating with both the shell and the hose;
   wherein when the male fitting is mounted to the shell, the blocking portion abuts against the bottom of the activity chamber to block the bore and the activity chamber, and the radial hole is disposed in the bore; and
   a hydraulic assembly being assembleable to the connecting assembly and having
      a housing having
         a hydraulic chamber; and
         an assembling hole communicating with the hydraulic chamber via a through hole;
      an elastic element disposed in the housing; and
      a valve unit disposed inside the hydraulic chamber and driven by the elastic element to seal the through hole;
   wherein when the connecting assembly is connected to the hydraulic assembly, the fillet portion pushes the O-ring to abut against a bottom of the assembling hole to prevent leakage from the housing;
   when the connecting assembly is connected to the hydraulic assembly, the second end of the male fitting abuts against the valve unit, and the blocking portion is detached from the bottom of the activity chamber to make the bore communicate with the activity chamber;
   wherein when the connecting assembly is connected to the hydraulic assembly, the adaptor is inserted in the assembling hole, and the male fitting and the valve unit drive each other mutually to make the radial hole and the through hole unsealed by the shell and the valve unit respectively and to make the connecting assembly and the hydraulic assembly communicate with each other; and
   when the connecting assembly is detached from the hydraulic assembly, the adaptor moves out from the assembling hole, and the male fitting is detached from the valve unit to make the radial hoe and the through hole sealed by the shell and the valve unit respectively.

2. The self-sealing hydraulic device as claimed in claim 1, wherein
   the blocking portion is connected to the abutting portion and has multiple blocks annularly arranged;
   the male fitting has
      a gap formed between each two adjacent blocks of the multiple blocks;
      a receiving groove annularly formed in the multiple blocks; and
      a seal mounted on and around the abutting portion, disposed in the receiving groove, and contacting the bottom of the activity chamber to block the bore and the activity chamber.

3. The self-sealing hydraulic device as claimed in claim 2, wherein
   the connecting assembly has
      an abutted flange connected to the abutting portion and disposed out of the shell;
      a compression spring mounted around the abutting portion and having two opposite ends respectively abutting against the abutted flange and a bottom of the second recess.

4. The self-sealing hydraulic device as claimed in claim 1, wherein
   the first recess of the shell communicates with the activity chamber;

the barb fitting has
- a connecting portion;
- a barb section integrally formed on the connecting portion;
- a conical hole disposed in the connecting portion; and
- a straight hole disposed in the barb section and communicating with the conical hole; and when the barb fitting is connected to the shell, the connecting portion is inserted through the first recess and is connected to the shell, and the barb section is inserted in the channel of the hose such that the channel of the hose, the straight hole, the conical hole of the barb fitting, and the activity chamber of the shell communicate with one another.

5. The self-sealing hydraulic device as claimed in claim 4, wherein the connecting portion of the barb fitting is screwed with the shell.

6. The self-sealing hydraulic device as claimed in claim 1, wherein
the protrusion has
- a chamfer portion; and
- a restricting groove disposed between the chamfer portion and the fillet portion to restrict the O-ring.

7. The self-sealing hydraulic device as claimed in claim 1, wherein
the connecting assembly has
- a connecting unit having
  - a central hole; and
  - an abutting chamfer formed at an end of the central hole;
the shell has an abutted chamfer formed in the first end face of the shell; and
the abutting chamfer of the connecting unit contacts the abutted chamfer of the shell to make the O-ring abut against the bottom of the assembling hole.

8. The self-sealing hydraulic device as claimed in claim 1, wherein
the valve unit has
- a checking portion having a polygonal cross section with multiple corners and multiple lateral faces;
- a rod portion formed on the checking portion and extending toward the through hole;
- a holding groove formed in the checking portion and surrounding the rod portion; and
- a sealing O-ring mounted in the holding groove;

when the checking portion is disposed in the hydraulic chamber, the multiple corners of the checking portion contact an internal surface of the hydraulic chamber of the housing to restrict the checking portion to move along the hydraulic chamber, and the sealing O-ring facilitates the rod portion to block the through hole; and when the connecting assembly and the hydraulic assembly communicate with each other, each one of the multiple lateral faces of the checking portion is spaced from the internal surface of the hydraulic chamber of the housing by a passage.

9. The self-sealing hydraulic device as claimed in claim 8, wherein
the hydraulic assembly is connected to a hydraulic brake having a connecting port;
the hydraulic chamber of the housing communicates with the inside of the connecting port;
the elastic element has two opposite ends;
one of the two opposite ends of the elastic element abuts against a bottom of the connecting port of the hydraulic brake to provide a force for the checking portion and the sealing O-ring to seal the through hole.

10. The self-sealing hydraulic device as claimed in claim 8, wherein
the hydraulic assembly is integrally formed on a brake lever assembly;
the brake lever assembly has
- a brake lever being able to swing between an active position and an inactive position;
the hydraulic assembly has
- a piston assembly inserted in the hydraulic chamber of the housing and connected to the brake lever of the brake lever assembly; and
the elastic element is disposed between the piston assembly and the checking portion to provide a force for the checking portion and the sealing O-ring to seal the through hole.

* * * * *